(12) United States Patent
O'Connor

(10) Patent No.: US 7,761,661 B2
(45) Date of Patent: Jul. 20, 2010

(54) PHYSICALLY-TAGGED CACHE WITH VIRTUAL FILL BUFFERS

(75) Inventor: Dennis M. O'Connor, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 76 days.

(21) Appl. No.: 12/256,766

(22) Filed: Oct. 23, 2008

(65) Prior Publication Data

US 2009/0049273 A1 Feb. 19, 2009

Related U.S. Application Data

(63) Continuation of application No. 10/819,022, filed on Apr. 5, 2004, now Pat. No. 7,451,271.

(51) Int. Cl.
*G06F 12/00* (2006.01)

(52) U.S. Cl. ............... 711/118; 711/3; 711/125; 711/128; 711/203

(58) Field of Classification Search ............... 711/118, 711/3, 125, 128, 203
See application file for complete search history.

(56) References Cited

U.S. PATENT DOCUMENTS

| | | | |
|---|---|---|---|
| 5,426,750 A * | 6/1995 | Becker et al. | ............... 711/207 |
| 5,479,627 A * | 12/1995 | Khalidi et al. | ............... 711/205 |
| 5,956,756 A * | 9/1999 | Khalidi et al. | ............... 711/207 |
| 6,006,312 A | 12/1999 | Kohn et al. | |
| 6,009,503 A | 12/1999 | Liedtke | |
| 6,539,457 B1 | 3/2003 | Mulla et al. | |
| 6,557,078 B1 | 4/2003 | Mulla et al. | |
| 6,976,117 B2 | 12/2005 | Clark et al. | |

\* cited by examiner

*Primary Examiner*—Stephen C Elmore

(57) ABSTRACT

A virtually indexed, physically-tagged cache is combined with one or more virtually-tagged fill-buffers.

19 Claims, 2 Drawing Sheets

PHYSICALLY-TAGGED CACHE WITH VIRTUAL FILL BUFFERS

RELATED APPLICATIONS

This application is a continuation of application Ser. No. 10/819,022, filed Apr. 5, 2004 now U.S. Pat. No. 7,451,271, entitled PHYSICALLY-TAGGED CACHE WITH VIRTUAL FILL BUFFERS, which is incorporated herein by reference.

Digital processors have cache memories for storing data and instructions. These memories use fast memories as compared to slow memories used for the computer's main memory. Through use of replacement algorithms, a relatively small cache memory compared to the size of the main memory provides a relatively high hit rate and consequently speeds up the flow of instructions to the execution unit of the computer. It would be beneficial to provide faster cache accesses and related power improvements in processors.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
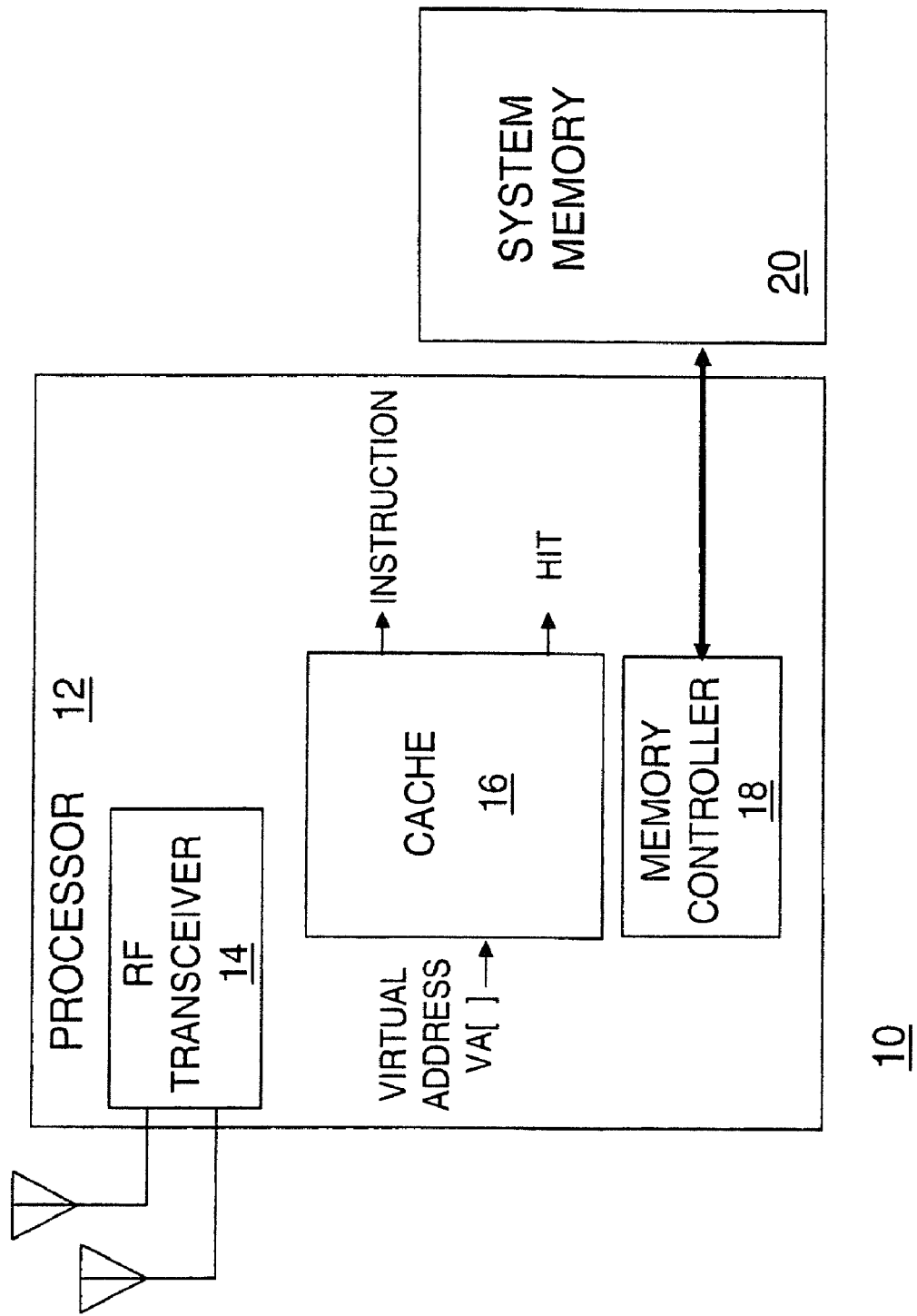
FIG. 1 illustrates a device having a direct-mapped, physically-tagged cache in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 illustrates a wireless device 10 that includes a direct-mapped, physically-tagged cache 16 in accordance with the present invention. In this embodiment, an RF transceiver 14 receives and transmits modulated signals from one or more antennas. RF transceiver 14 may be a stand-alone Radio Frequency (RF) integrated analog circuit, or alternatively, be embedded with a processor 12 as a mixed-mode integrated circuit. The received modulated signals are frequency down-converted, filtered, and then converted to a baseband digital signal.

An Operating System (OS) may manage the limited physical memory present on processor 12, dividing the physical memory among many processes that may be running simultaneously and allocating each process an appropriate memory share. The OS may rely on hardware support from a memory controller 18 to manage the memory and export functions that other subsystems and applications may use to interact with the memory. Caching is a basic technique of computer architecture, used for many different purposes. Generally speaking, cache 16 is a dedicated memory which tries to hold a working set of program data, program instructions, address translations, branch predictions or memory dependence predictions in a limited space. A mass storage device 20 may also be connected to processor 12.

Although the present invention is shown embedded in a wireless device 10, it should be understood that other applications and products may make use of the invention. Accordingly, the claimed subject matter may be incorporated into a variety of applications and included in microcontrollers, general-purpose microprocessors, Digital Signal Processors (DSPs), among other electronic components. In particular, the present invention may be used in smart phones, communicators and Personal Digital Assistants (PDAs), medical or biotech equipment, automotive safety and protective equipment, and automotive infotainment products. However, it should be understood that the scope of the present invention is not limited to these examples.

Figure 2:
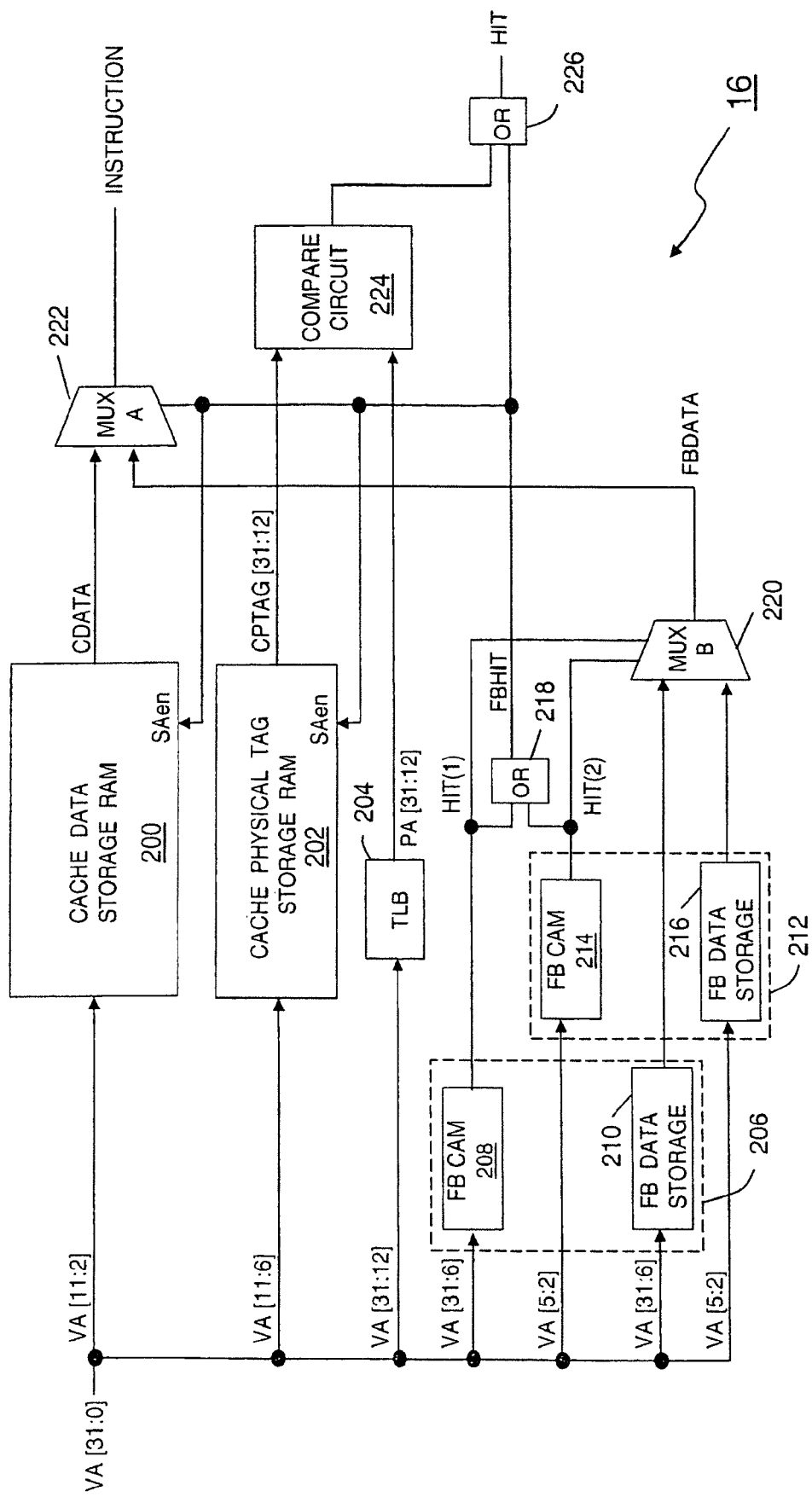
FIG. 2 is a diagram that highlights features of the cache in accordance with an embodiment of the present invention.

FIG. 2 is a block diagram that illustrates a virtually-indexed physically-tagged direct mapped cache 16. The direct mapped cache allows faster use of stored information irrespective of whether the cache stores data or instructions. Direct-mapped cache 16 includes a cache data storage RAM 200, a cache physical tag storage RAM 202 and a Translation Lookaside Buffer (TLB) 204 that each receive virtual address bits.

Cache 16 includes fill buffers 206 and 212 that are virtually-tagged and in one embodiment may be fully-associative, but in other embodiments may be set-associative, direct-mapped, etc. Fill buffer 206 includes a fill buffer Content Addressable Memory (CAM) 208 and a fill buffer data storage 210, while fill buffer 212 includes a fill buffer CAM 214 and a fill buffer data storage 216. For simplicity of illustration two fill buffers are described in the embodiment illustrated in FIG. 2, however, it should be understood that the number of fill buffers is not limiting to the present invention. Thus, any number of virtually-tagged fill buffers may be used. Fill buffers 206 and 212 may use "lazy retirement" which is used herein to mean that the content stored in fill buffer data storage 210 and 216 is not transferred to the cache until a new fill request is made.

Fill buffer CAM 208 and fill buffer CAM 214 generate a HIT(1) signal and a HIT(2) signal, respectively, when a stored data value matches the virtual address. An OR-gate 218 receives the HIT(1) and HIT(2) signals from the fill buffers and generates the FBHIT signal that may be used to inhibit the firing of the sense amps (SAen signal) within cache data storage RAM 200 and cache physical tag storage RAM 202, although inhibiting the sense amps is not a requirement of the present invention. A multiplexer 220 is connected to fill buffer data storage 210 and fill buffer data storage 216 and provides a FBDATA output, providing stored data from the fill buffer CAM 208 when HIT(1) is asserted and providing stored data from the fill buffer CAM 214 when HIT(2) is asserted. Note that the FBDATA output may be set to zero if neither HIT(1) nor HIT(2) is asserted. Alternatively, the FBDATA output may be set to provide stored data from either fill buffer, noting that the stored data at the FBDATA output is not selected by multiplexer 222 if the FBHIT signal is not asserted.

Multiplexer 222 is connected to receive the data word CDATA from cache data storage RAM 200 and the data word FBDATA from multiplexer 220 in providing a cache INSTRUCTION. A compare circuit 224 provides a comparison of the CPTAG [31:12] bits from cache physical tag storage RAM 202 with the PA[31:12] bits generated by TLB 204. A HIT signal is generated by OR-gate 226 when either compare circuit 224 matches the PA[31:12] bits with the CPTAG [31:12] bits or when the FBHIT signal is asserted.

In operation, virtual address VA[31:0] bits are provided to cache 16, with cache data storage RAM 200 receiving virtual address bits [11:2], cache physical tag storage RAM 202 receiving virtual address bits [11:6], TLB 204 receiving virtual address bits [31:12] and fill-buffers 206 and 212 each receiving virtual address bits [31:2]. Cache data storage RAM 200, cache physical tag storage RAM 202, TLB 204 and fill-buffers 206 and 212 initiate operations in parallel starting at the beginning of a clock cycle.

If the data or instruction being sought is stored in either of fill buffers 206 or 212, 25 then the appropriate HIT(1) or HIT(2) is signaled and the desired information is read out of the corresponding fill buffer data storage as FBDATA. OR-gate 218 receives the HIT(1) or HIT(2) signals and generates the FBHIT signal that again may be used to inhibit the sense amp enable signal (SAen), which disenables cache data storage RAM 200 and cache physical tag storage RAM 202 from providing output data. Note that fill buffers 206 and 212 are virtual, allowing a hit in the fill buffers to be determined prior to the completion of the VA-to-PA translation by TLB 204. This provides a power savings by preventing the unnecessary firing of the sense amps in the main array of cache 16. If the data or instruction being sought is stored in either of fill buffers 206 or 212, that requested information FBDATA is routed from the fill buffer storage through multiplexers 220 and 222 to the next stage (INSTRUCTION output).

The "lazy retirement" of the fill buffers significantly reduces the risk of pathological behavior in direct mapped cache 16, especially when the cache is used as an instruction cache. "Pathological behavior" refers to a condition of direct mapping that accounts for the worst possible behavior out of the cache. The "lazy retirement" used by fill buffer CAM 208 and fill buffer CAM 214 means that most entries in the fill buffers will usually be valid.

Alternatively, the data or instruction being sought may not be stored in either fill buffer 206 or fill buffer 212. Accordingly, the candidate tag CPTAG is read out of cache physical tag storage RAM 202 and the data (CDATA) is read out of the cache data storage RAM 200. Note that operation on the data (e.g. decoding an instruction) begins at the beginning of the clock cycle, even though it is not certain that the cache physical tag storage RAM 202 has the requested data. The candidate tag CPTAG is compared to the requested address PA[31:12] by compare circuit 224. If the tag and address match, OR-gate 226 generates a HIT and CDATA from cache data storage RAM 200 is provided as the INSTRUCTION out of cache 16. If the tag and address do not match, the operation on the data is canceled and a fill request for the requested data is made to the outer-next level of the memory hierarchy.

A fill request triggers the fill-buffer management logic (not shown). If fill buffer 206 or 212 is empty, that fill buffer is allocated to the fill request and data is placed in the allocated buffer. If neither fill buffer 206 nor 212 is empty, then one of the well-known replacement algorithms may be used to determine a fill buffer to replace the corresponding entry in the direct-mapped cache or the entry will be invalidated.

By now it should be apparent that the direct mapped cache may be used in processor cores to provide faster cache access within processors and is especially applicable to instruction caches. Whereas other processors may use virtually-tagged fill buffers associated with virtually-tagged caches or physically-tagged fill buffers associated with physically-tagged caches, the present invention incorporates a physically-tagged direct-mapped cache with virtually-tagged fill buffers. The embodiment illustrated in FIG. 2 provides the ability to use the data before the cache tag compare is complete. The pathological behavior of direct-mapped cache may be reduced using features of the present invention. Further, power may be saved by not firing the sense amps in the physically-tagged cache when a hit in the fill buffers occurs.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A device comprising:
  a cache to receive a virtual address corresponding to information that is being sought, the cache comprising:
    a memory to generate a candidate tag based on the virtual address, the candidate tag corresponding to information that is physically tagged and stored in the memory;
    a translation lookaside buffer to generate a physical address based on the virtual address;
    a compare circuit to compare the physical address to the candidate tag, and generate a first hit signal in response to the physical address matching the candidate tag; and
    a fill buffer to generate a second hit signal in response to the virtual address corresponding to information that is virtually tagged and stored in the fill buffer.

2. The device of claim 1, wherein the memory comprises:
  a cache physical tag storage RAM that stores the information that is physically tagged; and
  a cache physical tag storage RAM that generates the candidate tag based on the virtual address.

3. The device of claim 1, wherein the fill buffer comprises:
  a fill buffer content addressable memory that generates the second hit signal in response to the virtual address matching a stored data value in the fill buffer content addressable memory; and
  a fill buffer data storage that stores the information that is virtually tagged.

4. The device of claim 1, wherein if the information being sought is stored in the fill buffer, the fill buffer is configured to generate the second hit signal prior to the translation lookaside buffer having completed the generation of the physical address.

5. The device of claim 4, wherein:
  the memory comprise sense amps; and
  if the information being sought is stored in the fill buffer, the fill buffer is further configured to generate an inhibit signal that inhibits firing of the sense amps in the memory.

6. The device of claim 1, wherein each of the memory, the translation lookaside buffer, and the fill buffer initiates operation on at least a portion of the virtual address during a same clock cycle.

7. The device of claim 6, wherein the virtual address comprises 32 bits.

8. The device of claim 1, wherein the cache comprises a direct mapped cache.

9. The device of claim 1, wherein the device comprises a wireless device.

10. The device of claim 1, wherein the device comprises a microcontroller, a digital signal processor, a microprocessor, a smart phone, a communicator, a personal digital assistant, medical equipment, biotech equipment, automotive safety and protective equipment, or an automotive infotainment product.

11. The device of claim 1, wherein the information being sought comprises an instruction or data.

12. The device of claim 1, wherein the fill buffer is fully-associative, set-associative, or direct-mapped.

13. A method of processing a request for information stored in a cache, the cache comprising a memory and a fill buffer, the method comprising:
   receiving a virtual address;
   generating a candidate tag based on the virtual address, the candidate tag corresponding to information that is physically tagged and stored in the memory;
   generating a physical address based on the virtual address;
   comparing the physical address to the candidate tag, and generating a first hit signal in response to the physical address matching the candidate tag, the first hit indicating that the requested information is stored in the memory; and
   generating a second hit signal in response to the virtual address corresponding to information that is virtually tagged and stored in a fill buffer, the second hit indicating that the requested information is stored in the fill buffer.

14. The method of claim 13, wherein if the requested information is stored in the fill buffer, generating a second hit signal comprises generating the second hit signal prior to the generation of the physical address based on the virtual address.

15. The method of claim 14, wherein:
   the memory comprises sense amps; and
   the method further includes generating an inhibit signal that inhibits firing of the sense amps if the requested information is stored in the fill buffer.

16. A cache configured to receive a virtual address corresponding to information being sought, the cache comprising:
   a memory to generate a candidate tag based on the virtual address, the candidate tag corresponding to information that is physically tagged and stored in the memory;
   a translation lookaside buffer to generate a physical address based on the virtual address;
   a compare circuit to compare the physical address to the candidate tag, and generate a first hit signal in response to the physical address matching the candidate tag; and
   a fill buffer to generate a second hit signal in response to the virtual address corresponding to information that is virtually tagged and stored in the fill buffer.

17. The cache of claim 16, wherein each of the memory, the translation lookaside buffer, and the fill buffer initiates operation on at least a portion of the virtual address during a same clock cycle.

18. The cache of claim 16, wherein the information being sought comprises an instruction or data.

19. The cache of claim 16, wherein if the information being sought is stored in the fill buffer, the fill buffer is configured to generate the second hit signal prior to the translation lookaside buffer having completed the generation of the physical address.

\* \* \* \* \*